US006682120B2

United States Patent
Kamida et al.

(10) Patent No.: US 6,682,120 B2
(45) Date of Patent: Jan. 27, 2004

(54) VEHICLE SEAT

(75) Inventors: Koji Kamida, Saitama (JP); Kazuyuki Kaneko, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/299,399

(22) Filed: Nov. 18, 2002

(65) Prior Publication Data
US 2003/0094830 A1 May 22, 2003

(30) Foreign Application Priority Data

Nov. 19, 2001 (JP) ........................................ 2001-353694
Aug. 20, 2002 (JP) ........................................ 2002-239480

(51) Int. Cl.[7] ................................................ B60N 2/36
(52) U.S. Cl. ................................ 296/65.09; 296/65.16; 296/69; 297/15; 297/335
(58) Field of Search .......................... 296/63, 65.01, 296/66, 65.05, 65.09, 65.16, 69; 297/15, 335

(56) References Cited

U.S. PATENT DOCUMENTS

| 4,971,395 A | * | 11/1990 | Coussemacq et al. .... 297/378.1 |
| 5,269,581 A | * | 12/1993 | Odagaki et al. .............. 296/66 |
| 5,868,451 A | * | 2/1999 | Uno et al. ..................... 296/66 |
| 5,927,808 A | * | 7/1999 | Esker .......................... 297/333 |
| 6,231,101 B1 | * | 5/2001 | Kamida et al. ................ 296/63 |
| 6,318,784 B2 | * | 11/2001 | Nishide .................... 296/65.09 |
| 6,361,239 B1 | * | 3/2002 | Parikh et al. ................ 403/282 |
| 6,394,525 B1 | * | 5/2002 | Seibold .................... 296/65.09 |
| 6,416,107 B1 | * | 7/2002 | Kanaguchi et al. ...... 296/65.09 |
| 6,435,589 B2 | * | 8/2002 | Shimizu et al. .......... 296/65.09 |
| 2001/0002759 A1 | * | 6/2001 | Nishide .................... 296/65.09 |
| 2001/0026075 A1 | * | 10/2001 | Shimizu et al. .......... 296/65.05 |
| 2002/0047287 A1 | * | 4/2002 | Kawasaki .................... 296/64 |

FOREIGN PATENT DOCUMENTS

JP 5-40029 10/1993

* cited by examiner

Primary Examiner—Stephen T. Gordon
Assistant Examiner—Patricia L. Engle
(74) Attorney, Agent, or Firm—Merchant & Gould, P.C.

(57) ABSTRACT

A vehicle seat wherein left and right seat backs are attached to left and right seat cushions, respectively, in such a manner as to be folded up thereon. A support shaft is provided on the left and right seat cushions for allowing the left and right seat cushions and the left and right seat backs folded up on the left and right seat cushions to be rotated toward the rear of a vehicle individually. The seat cushions and the seat backs so rotated about the support shaft are stored in a recessed portion in a vehicle body floor. The support shaft is provided on the vehicle body floor so that the support shaft is supported in the vicinity of edge portions of the recessed portion.

12 Claims, 15 Drawing Sheets

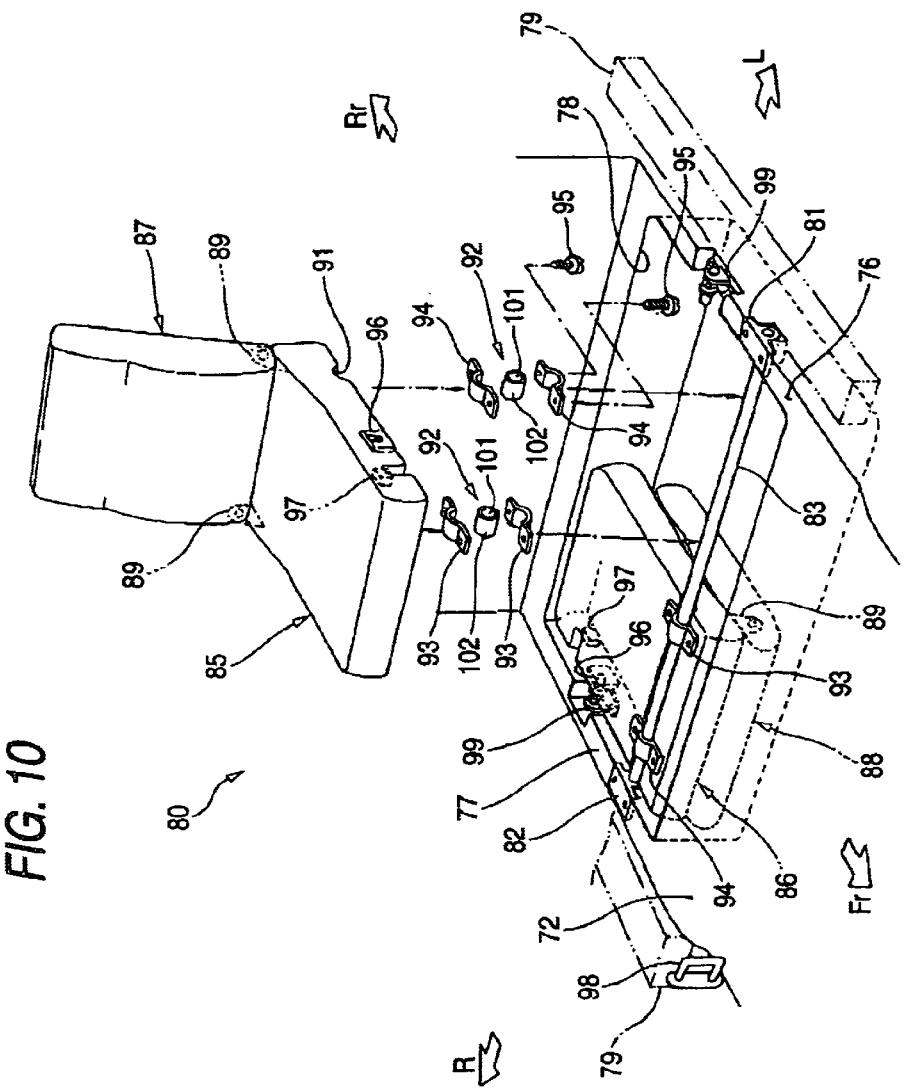

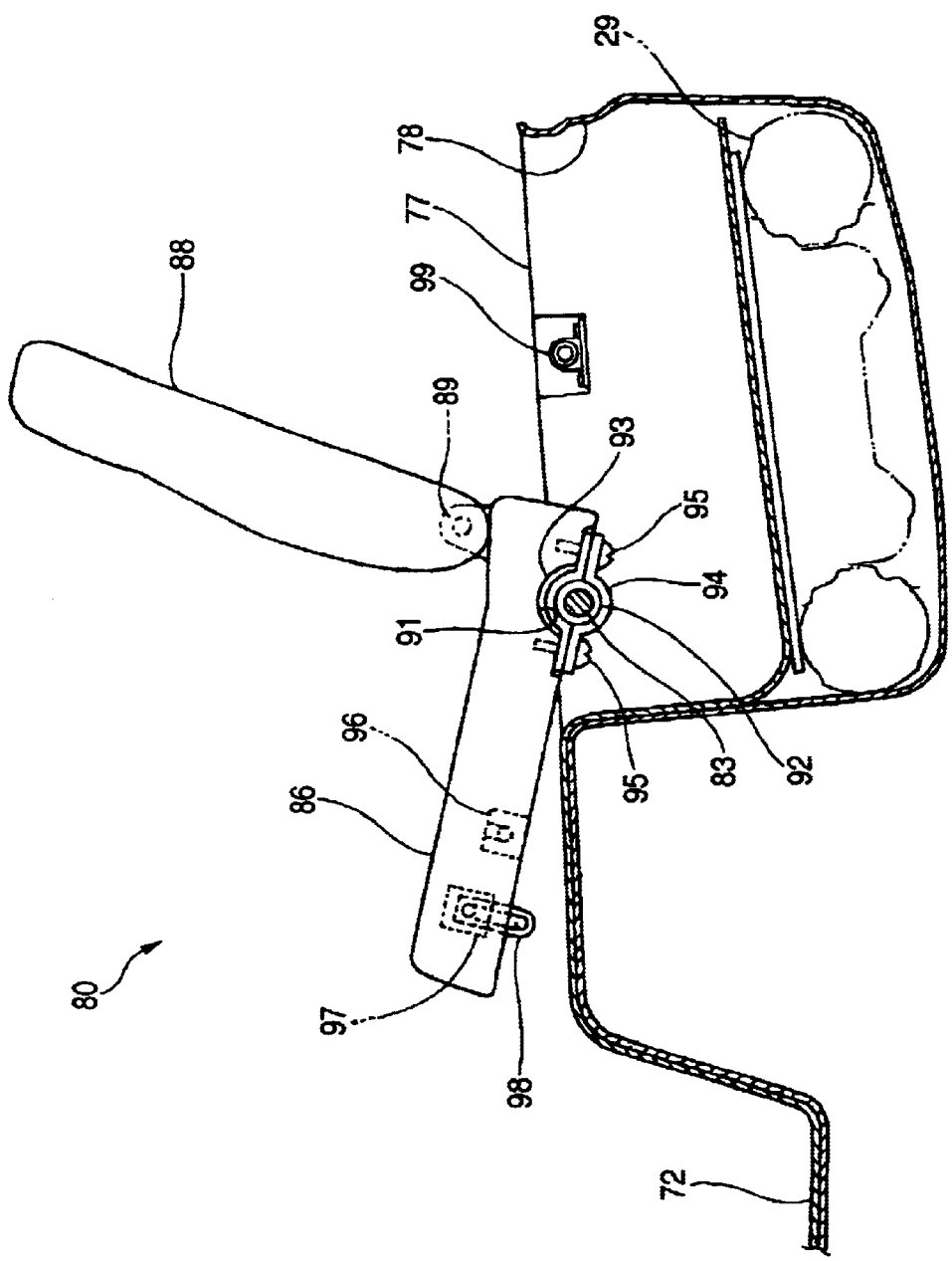

VEHICLE SEAT

BACKGROUND OF THE INVENTION

1. Field of the Invention

The present invention relates to a vehicle seat wherein a seat back is folded up on a seat cushion, and wherein the seat cushion and the seat back so folded up on the seat cushion are rotated to the rear of a vehicle so as to be stored in a recessed portion provided in a vehicle body floor.

2. Description of the Related Art

As a vehicle seat, for example, a "seat storing structure" is known which is disclosed in JP-B-5-40029U.

As shown in FIG. 15, the conventional seat storing structure relates to a vehicle seat 208 wherein a seat back 211 is attached to a seat cushion 210 in such a manner as to be folded up on the seat cushion via a pivot shaft 215, and wherein a front part of the seat cushion 210 is detachably attached to a floor 202 via a support portion 218 whereas a rear part of the seat cushion 210 is rotatably attached to the floor 202 via a pivot shaft 217. The seat back 211 is folded up on the seat cushion 210, and the seat cushion 210 and the seat back 211 so folded up on the seat cushion 210 are rotated to the rear of a vehicle so that the seat cushion 210 and the seat back 211 can be stored in a recessed portion 209 formed in the floor 202.

According to the seat storing structure described above, however, in a state where the seat cushion 210 and the seat back 211 are stored in the recessed portion 209 in the floor 202 after the seat back 211 is folded up on the seat cushion 210 and then the seat cushion 210 and the seat back 211 folded up on the seat cushion 210 are rotated to the rear of the vehicle, the support portion 218 is left projecting upwardly at right angles.

Then, time and labor are required to collapse the perpendicularly projecting support portion 218, this complicating the series of operations of folding up the seat, rotating the seat so folded up and storing the same.

Namely, a technique is desired for improving the seat arrangement for more convenience while making the storage of the seat easier.

For example, in a case where a vertically long article such as a garden plant is loaded on a vehicle, it is convenient to store it by making use of a recessed portion 209 behind the seat back 211 without folding up the seat back 211, and in a case where a horizontally long box-like article is loaded on the vehicle, it is sometimes convenient to store it with the seat back 211 being folded up.

With the seat storing structure, however, since only available seat arrangements are a seating condition where the seat back 211 is erected from the seat cushion 210, a folded condition where the seat back 211 is folded up on the seat cushion 210 and a stored condition where the seat cushion 210 and the seat back 211 are stored in the recessed portion 209, the seat storing structure is sometimes felt to be inconvenient when, for example, the vertically long article such as a garden plant and the horizontally long box-like article are tried to be loaded on the vehicle at the same time, the versatility in seat arrangements being thereby desired.

SUMMARY OF THE INVENTION

An object of the invention is to provide a vehicle seat which can provide the required versatility in seat arrangements and improve the convenience in seat arrangements, as well as the storing properties of the seat.

With a view to attaining the object, according to a first aspect of the invention, there is provided a vehicle seat, including:

left and right seat cushions;

left and right seat backs attached to the left and right seat cushions, respectively, in such a manner as to be folded up thereon, a support shaft provided on the left and right seat cushions for allowing the left and right seat cushions and the left and right seat backs folded up on the left and right seat cushions to be rotated toward the rear of a vehicle individually, wherein the seat cushions and the seat backs so rotated about the support shaft are storable in a recessed portion in a vehicle body floor, wherein the support shaft is provided in such a manner as to be situated in the vicinity of the surface of the vehicle body floor or within the recessed portion so that the support shaft is supported in the vicinity of edge portions of the recessed portion.

According to the construction wherein the left and right seat backs are attached, respectively, to the left and right seat cushions in such a manner as to be folded up on the left and right seat cushions, respectively, and wherein the seat cushions and the seat backs so folded up on the seat cushions are rotated individually to the rear of the vehicle so that the seat cushions and the seat backs can be stored in the recessed portion in the vehicle body floor, for example, by storing one of the left and right seat cushions and seat backs in the recessed portion and folding up the other of the seat backs on the other of the seat cushions a vertically long article such as a garden plant is loaded on the vehicle by making use of the recessed portion and a horizontally long box-like article is loaded on the seat back so folded up or on the seat cushion stored in the recessed portion. Namely, the vertically long article such as a garden plant and the horizontally long box-like article can be loaded at the same time, and a variety of seat arrangements can be realized depending upon the types of articles.

In addition, the support shaft which is provided to be supported in the vicinity of the surface of the vehicle body floor or within the recessed portion constitutes no hindrance to the loading and unloading of articles. As a result, the working efficiency with which articles are loaded and unloaded can be improved. In addition, since the support shaft is supported in the vicinity of the edge portions of the recessed portion, the rigidity of the edge portion allows the left and right seat cushions to be supported at central positions of the recessed portion.

According to a second aspect of the invention, there is provided a vehicle seat as set forth in the first aspect of the invention, wherein inner tubes of bearings are fitted on the support shaft, and wherein outer tubes of the bearings are fixed to the left and right seat cushions via holding members, whereby end portions of the support shaft are fixed to sides of the surface of the vehicle body floor or sides of the recessed portion.

In general, central portions of the vehicle body surface or central portions of the recessed portion are low in rigidity when compared with end portions thereof. In case the support shaft is fixed to the portions which are low in rigidity, reinforcements are sometimes required, leading to a call for an increase in weight of the vehicle body. To cope with this, fixing the support shaft to the sides of the vehicle body floor surface or the sides of the recessed portion, for example, to the side frames which are higher in rigidity at the end portions thereof can manage to omit reinforcements, thereby making it possible to reduce weight of the vehicle.

According to a third aspect of the invention, there is provided a vehicle seat including:

a seat cushion;

a seat back folded up on the seat cushion, wherein the seat cushion and the seat back so folded up on the seat cushion are rotated toward the rear of a vehicle so that the seat cushion and the seat back so rotated are stored in a recessed portion provided in a vehicle body floor;

a supporting member (a lock member adapted to be fixed to a striker on the vehicle body floor or a support member adapted to be struck against the vehicle body floor) suspended from a lower surface of a front part of the seat cushion in such a manner as to freely swing back and forth;

a bracket of the vehicle body floor for rotatably attaching a rear part of the seat cushion; and a connecting member (a link or a cable) connecting the bracket with the support member so that the support member is allowed to fall down into the lower surface of the seat cushion when the seat cushion is rotated rearward.

It will be preferred that the perpendicularly projecting lock member or support member can be collapsed when the seat cushion and the seat back folded up on the seat cushion are rotated toward the rear of the vehicle so that the seat cushion and the seat back are stored in the recessed portion provided in the vehicle body floor.

To make this happen, the bracket for rotatably supporting the rear part of the seat cushion and the lock member are linked together by means of the link or cable so that the lock member is allowed to fall down into the lower surface of the seat cushion when the seat cushion is rotated rearward. Namely, the posture of the lock member or the support member can automatically be altered from the projecting condition to a collapsed condition, whereby the seat cushion and the seat back which are folded up into the vehicle body floor can be stored with good appearance, and the storing properties of the seat can be improved.

According to a fourth aspect of the invention, there is provided a vehicle seat as set forth in the third aspect of the invention, wherein a storage portion for storing the lock member is formed in the lower surface of the seat cushion so that the lock member can be stored in the storage portion when the seat cushion is rotated rearward.

By constructing the vehicle seat such that the storage portion for storing the lock member is formed in the lower surface of the seat cushion so that the lock member can be stored in the storage portion when the seat cushion is rotated rearward, the lock member can be stored in the storage portion when the seat cushion and the seat back are stored in the recessed portion. As a result, the lower surface of the seat cushion can constitute a flat surface when the seat cushion is stored in the recessed portion.

According to a fifth aspect of the invention, there is provided a vehicle seat as set forth in the third aspect of the invention, wherein the bracket extends rearward from a front wall surface of the recessed portion, and wherein retaining members for retaining the seat cushion are provided on left and right wall surfaces of the recessed portion.

By constructing the vehicle seat such that the bracket extends rearward from the front wall surface of the recessed portion and the retaining members for retaining the seat cushion are provided in the left and right wall surfaces of the recessed portion, the bracket and the retaining members are prevented from protruding from the vehicle body floor surface. As a result, the vehicle body floor with the vehicle seat being stored therein can be used effectively.

According to a sixth aspect of the invention, there is provided a vehicle seat as set forth in the third aspect of the invention, wherein the seat cushion and the seat back are divided transversely so that the seat cushions and the seat backs so divided can be stored in the recessed portion individually.

The convenience in arranging the seat can be attempted to be improved by dividing the seat cushion and the seat back transversely so that the seat cushions and the seat backs so divided can be stored in the recessed portion individually.

BRIEF DESCRIPTION OF THE DRAWINGS

FIG. 10 is an exploded view of the vehicle seat according to the second embodiment of the invention;

FIG. 11 is a side view of the vehicle seat according to the second embodiment of the invention;

DETAILED DESCRIPTION OF THE PREFERRED EMBODIMENTS

Figure 1:
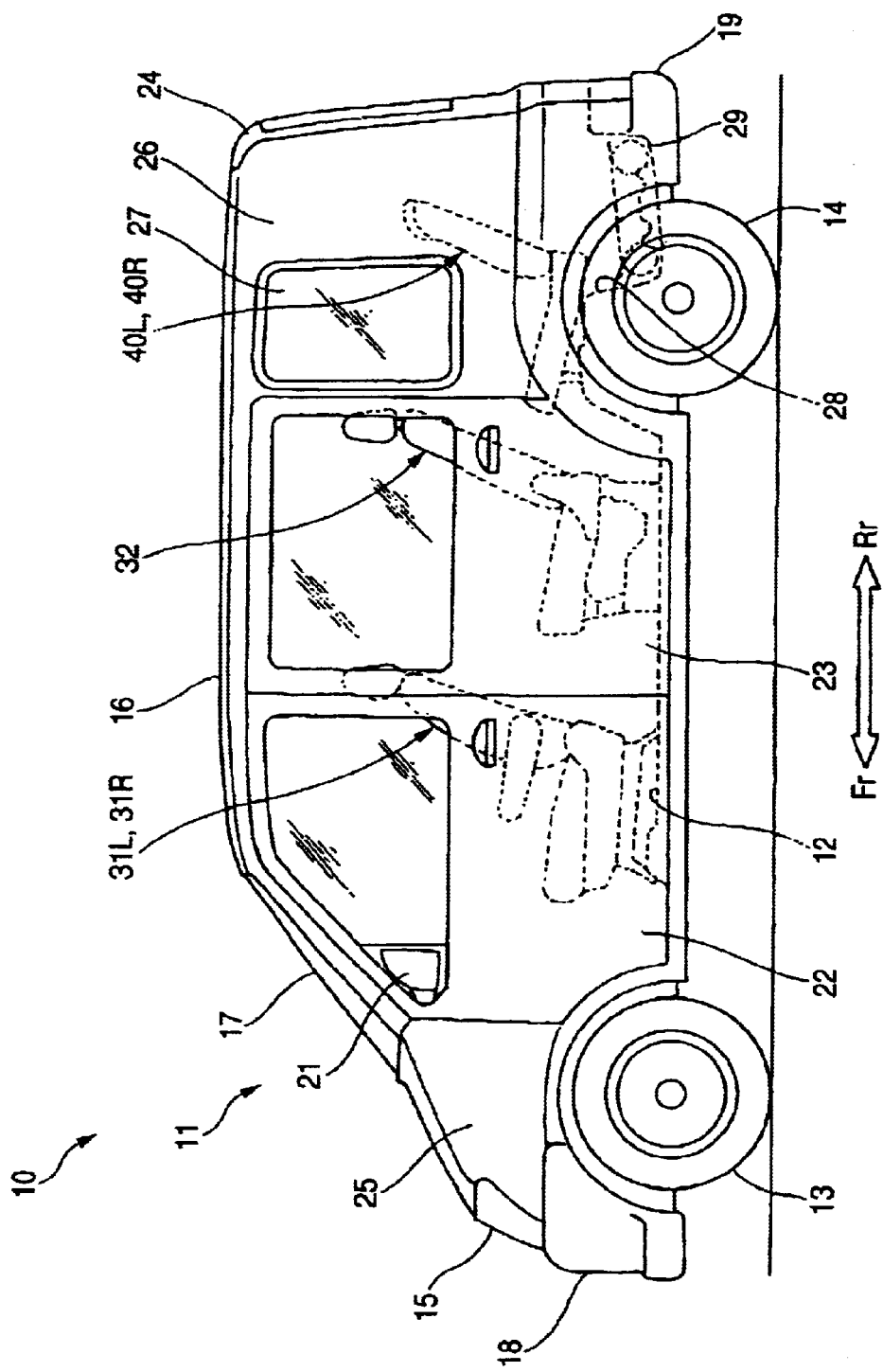
FIG. 1 is a side view of a vehicle equipped with a vehicle seat according to the invention.

Embodiments of the invention will be described with reference to the accompanying drawings. Note that "front," "rear," "left," "right," "up," and "down" indicate such directions as viewed from the driver, and that Fr denotes a front side; Rr: a rear side; L: a left side; and R: a right side. In addition, the drawings are to be viewed in directions in which reference numerals are oriented.

FIG. 1 is a side view of a vehicle which is equipped with a vehicle seat according to the invention. In the figure, reference numeral 10 denotes a vehicle; 11: a vehicle body; 12: a vehicle body floor; 13: a front wheel; 14: a rear wheel; 15: a headlamp; 16: a roof; 17: a windscreen; 18: a front bumper; 19: a rear bumper; 21: a outside rearview mirror; 22: a front door; 23: a rear door; 24: a tail gate; 25: a front fender; 26: a quarter panel; 27: a quarter panel window; 28: a recessed portion provided in the vehicle body floor 12; and 29: a spare tire stored in the recessed portion 28. The vehicle 10 is structured such as to provide a wide variety of seat arrangements by being constituted by first-row seats 31L, 31R, a second-row seat 32 and third-row seats 40L, 40R.

The first-row seat 31R is a driver's seat; the first-row seat 31L; a front passenger's seat; the second-row seat 32: a bench seat which can be folded up and sprung up; and the seats 40L, 40R (in the third row) according to the invention are, as will be described later, such that they can be stored in the recessed portion 28 provided in the vehicle body floor 12 when folded up and that the left third-row seat 40L and right third-row seat 40R are divided transversely.

Figure 2:
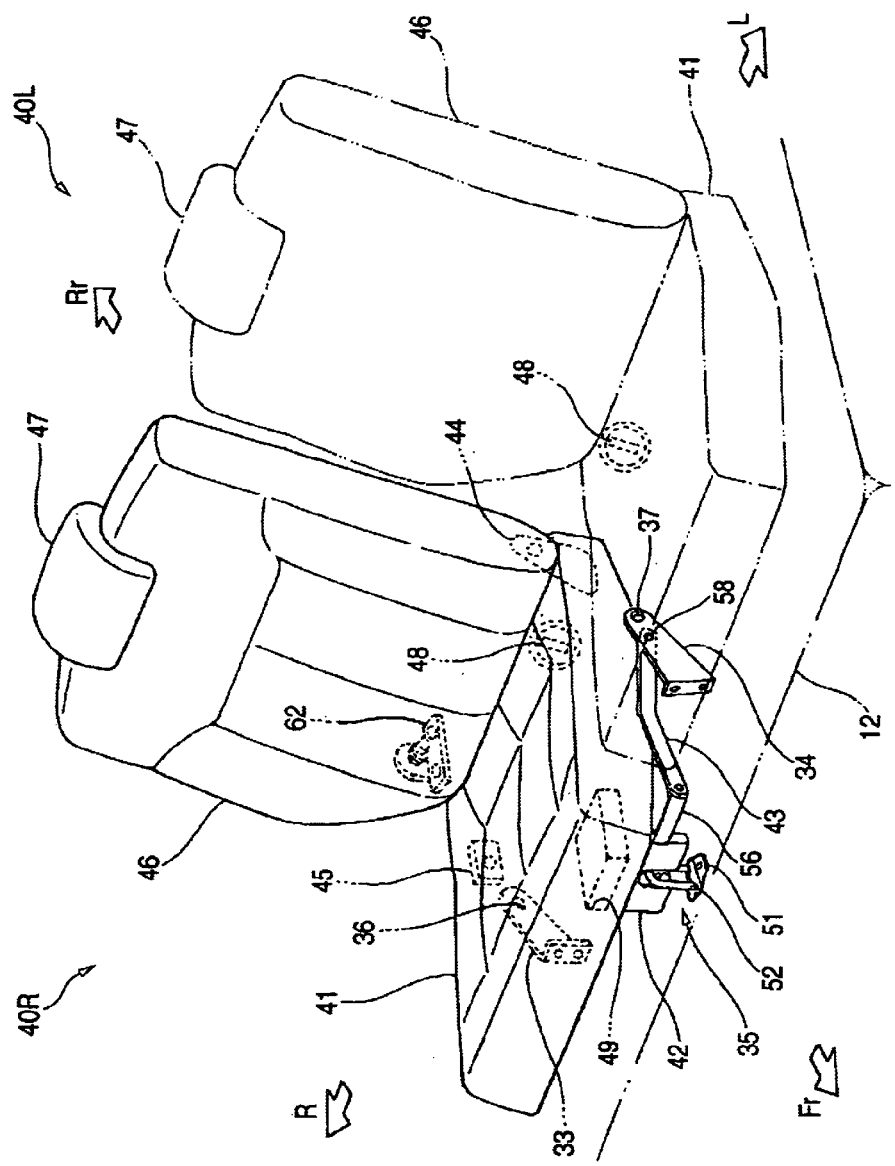
FIG. 2 is a perspective view of the vehicle seat according to the invention.

FIG. 2 is a perspective view of the vehicle seat according to the invention, the right third-row seat 40R includes brackets 33, 34 attached to the recessed portion 28 (refer to FIG. 1) in the vehicle body floor 12, a seat cushion 41 attached rotatably to the brackets 33, 34 at a rear part thereof, a lock member 42 as a supporting member suspended rotatably from a lower surface of a front part of the seat cushion 41 so as to detachably attach to a striker 35 provided on the vehicle body floor 12, a link 43 as a connecting member extending from the lock member 42 so as to link the lock member 43 with the bracket 34, a seat back 46 attached to the seat cushion 41 via hinges 44, 44 (one of them is not shown) in such a manner as to be folded up on the seat cushion 41 and a pillow 47 attached to the seat back 46 in such a manner as to adjust the height thereof.

The bracket 33 includes a support shaft 36 for rotatably supporting the seat cushion 41 at a rear part on a right side thereof, and the bracket 34 includes a support shaft 37 for rotatably supporting the seat cushion 41 at a rear part on a left side thereof.

The seat cushion 41 includes a fastening portion 45 for fastening the seat cushion 41 to the vehicle body floor 12 side, a lock releasing lever 48 attached to a rear part of the seat cushion 41 for releasing the lock of the lock member 42 and a storage portion 49 formed in the lower surface of the seat cushion 41 for storing the lock member 42.

Reference numeral 62 denotes a lock member for locking the seat cushion 41 to the vehicle body floor 12 side when the seat cushion 41 and the seat back 46 are stored in the recessed portion 28 in the vehicle body floor 12, the lock member being provided in the recessed portion 28 (refer to FIG. 1) in the vehicle body floor 12.

In addition, the left third-row seat 40L is a seat which is transversely symmetrical with the right third-row seat 40R, and the left and right third-row seats 40L, 40R are such as to be divided transversely in the seat cushions 41, 41 and seat backs 46, 46 so that the left and right seat cushions 41, 41 and seat backs 46, 46 can be stored in the recessed portion 28 (refer to FIG. 1) individually.

By constructing the left and right third-row seats 40L, 40R such that they are divided transversely in the seat cushions 41, 41 and seat backs 46, 46 so that the left and right seat cushions 41, 41 and seat backs 46, 46 can be stored in the recessed portion 28 individually, the convenience in arranging the seats can be attempted to be improved.

Figure 3:
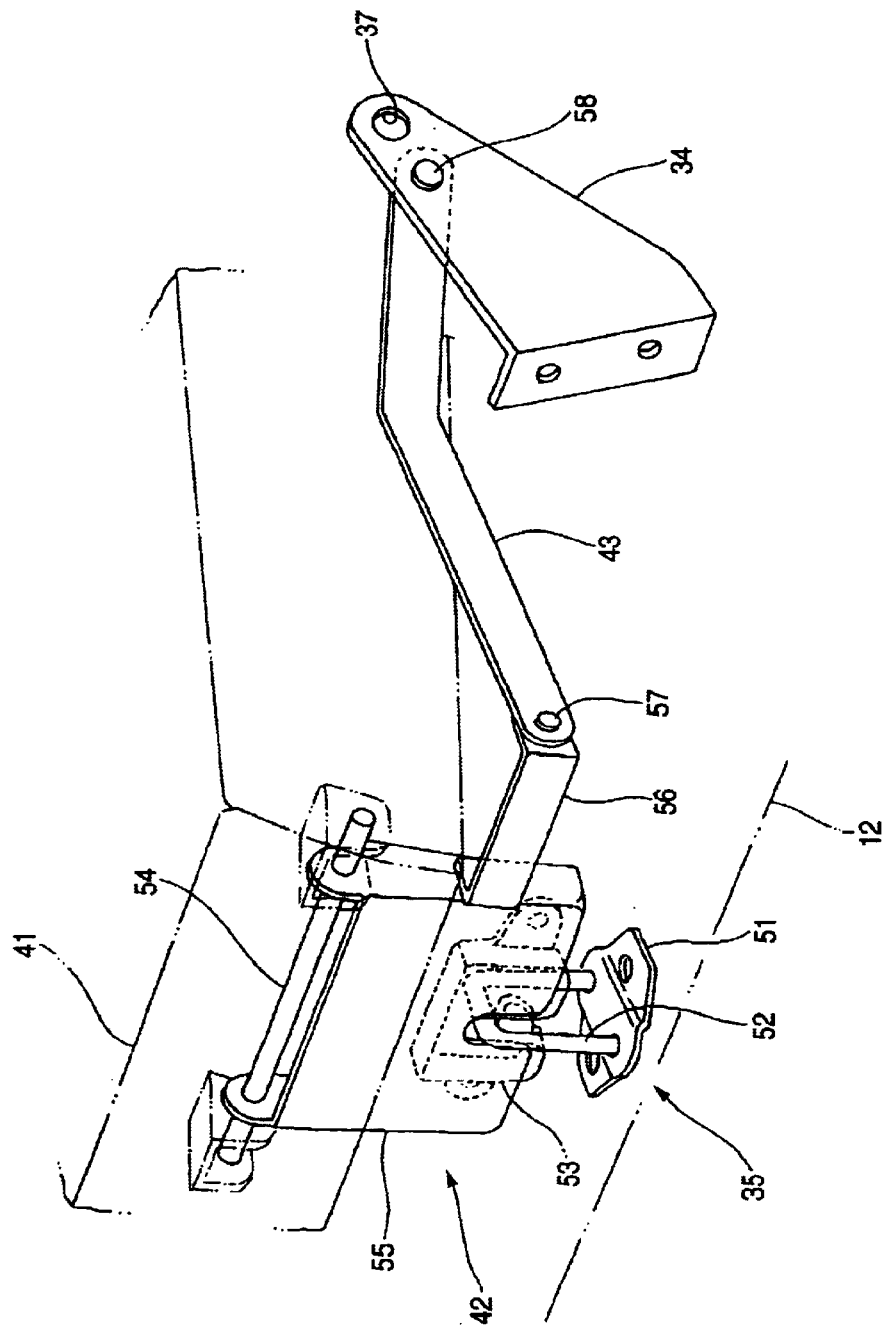
FIG. 3 is an enlarged view showing a main part of the vehicle seat according to the invention.

FIG. 3 is an enlarged view showing a main part of the vehicle seat according to the invention, which shows the striker, the lock member and the link.

The striker 35 is a member in which a U-shaped hook 52 is integrally formed on a flat plate-like holder 51, with the holder 51 being attached to the vehicle body floor 12 side.

The lock member 42 includes a lock portion 53 adapted to fit on the striker 35, a foot portion 55 which supports the lock portion 53 and which is rotatably attached to the seat cushion 41 via a rod member 54 and a stay portion 56 which extends outwardly from the foot portion 55 so as to connect to the link 43.

The link 43, which is pin connected to the stay portion 56 of the lock member 42 at one end thereof and is also pin connected to the bracket 34 at the other end thereof, is a member for automatically altering the posture of the lock member 42 from a protruding condition to a collapsed condition while rotating the seat cushion 41 and the seat back 46 when the seat cushion 41 and the seat back 46 folded up on the seat cushion 41 are rotated toward the rear of the vehicle so that the seat cushion 41 and the seat back 46 (refer to FIG. 2) are stored in the recessed portion 28 (refer to FIG. 1) in the vehicle body floor 12. In addition, the link 43 also functions to allow the lock member 42 to spring up from the lower surface of the seat cushion 41 when the seat cushion 41 is rotated forward.

In addition, reference numeral 57 denotes a pin for connecting the stay portion 56 with one end of the link 43, and reference numeral 58 denotes a pin for connecting the bracket 34 with the other end of the link 43.

Figure 4:
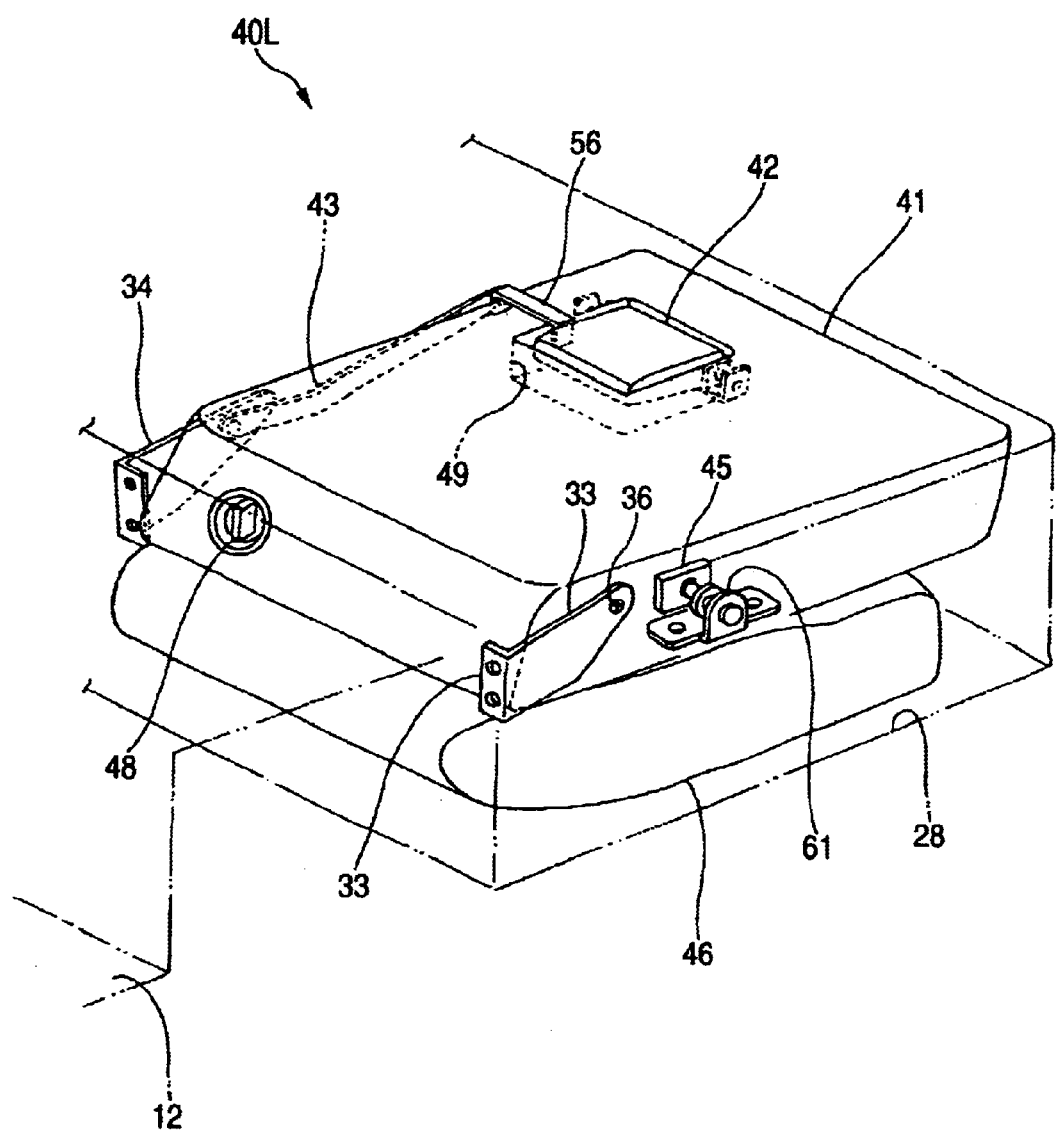
FIG. 4 is a perspective view showing a stored condition of the vehicle seat according to the invention.

FIG. 4 is a perspective view showing a stored condition of the vehicle seat according to the invention, in which the left third-row seat 40L is stored by folding up the seat back 46 onto the seat cushion 41, the seat cushion 41 and the seat back 46 so folded up are then rotated rearward and the seat cushion 41 and the seat back 46 are finally stored in the recessed portion 28 formed in the vehicle body floor 12.

In the figure, reference numeral 12 denotes the vehicle body floor; 33, 34: brackets; 41: the seat cushion; 42: a lock member; 43: a link; 45: a fastening portion; 46: the seat back; 48: a lock releasing lever; and 49: a storage portion.

In addition, reference numeral 61 denotes a left retaining member for retaining the seat cushion 41 to the vehicle body floor 12 side when the seat cushion 41 and the seat back 46 are stored in the recessed portion 28 in the vehicle body floor 12, the member being attached within the recessed portion 28 in the vehicle body floor 12.

The third-row seat 40L is constructed such that the storage portion 49 is formed in the lower surface of the seat cushion 41 for storing the lock member 42, so that the lock member 42 can be stored in the storage portion 49 when the seat cushion 41 is rotated rearward.

By constructing the third-row seat 40L such that the storage portion 49 is formed in the lower surface of the seat cushion 41 for storing the lock member 42, so that the lock member 42 can be stored in the storage portion 49 when the seat cushion 41 is rotated rearward, the lock member 42 can be stored in the storage portion 49 when the seat cushion 41 and the seat back 46 are stored in the recessed portion 28.

As a result, the lower surface of the seat cushion 41 when stored in the recessed portion 28 can be made to provide a flat surface. Note that as with the third-row seat 40L, the third-row seat 40R also has a function to store the lock member 42.

Figure 5:
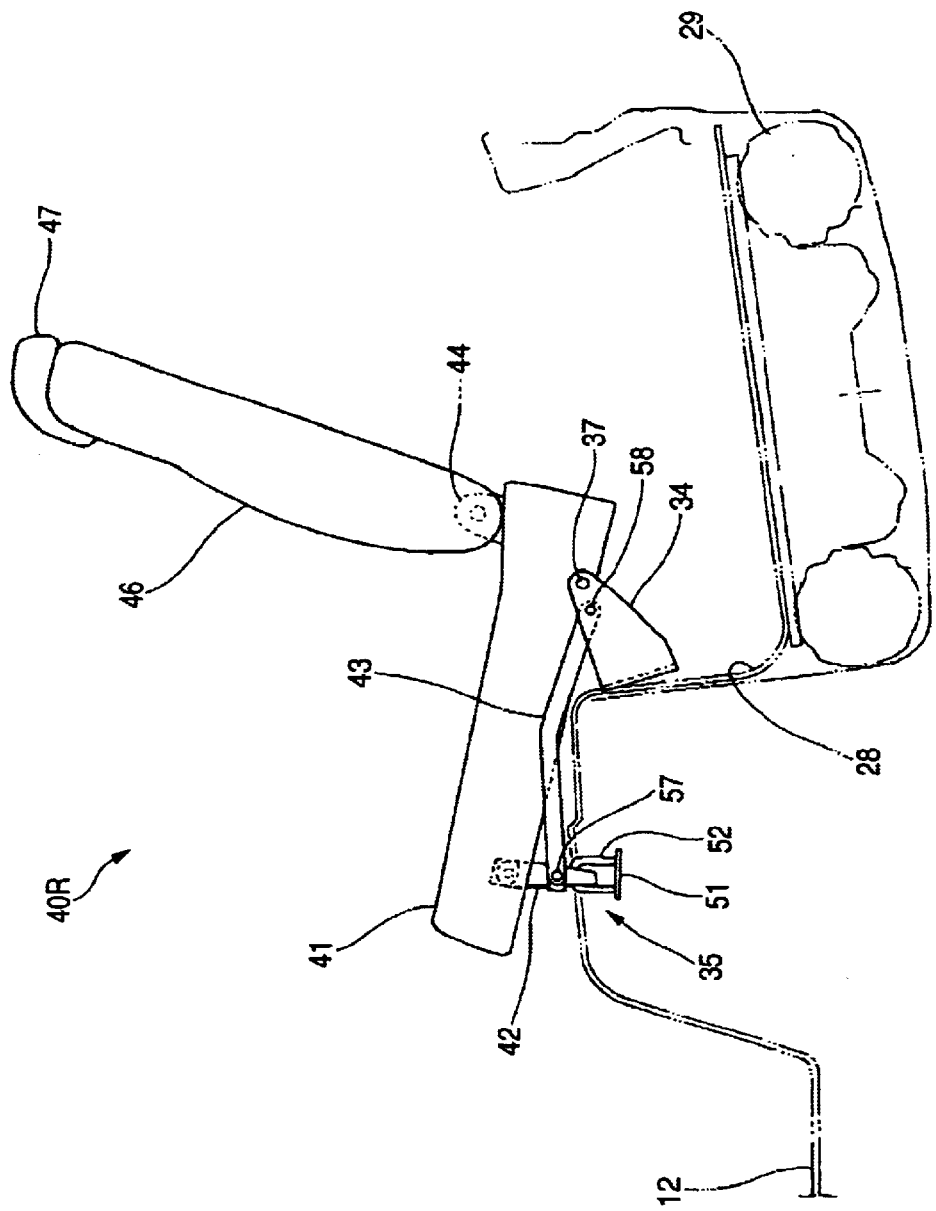
FIG. 5 is a side view of the vehicle seat according to the invention.

FIG. 5 is a side view of the vehicle seat according to the invention, which shows the right third-row seat 40R.

In the third-row seat (vehicle seat) 40R, wherein the seat back 46 is folded up on the seat cushion 41, wherein the seat cushion 41 and the seat back 46 so folded up on the seat cushion 41 are rotated toward the rear of a vehicle, and wherein the seat cushion 41 and the seat back 46 so rotated are stored in the recessed portion 28 provided in the vehicle body floor 12, the lock member 42 adapted to be fixed to the striker 35 on the vehicle body floor 12 is suspended from a lower surface of a front part of the seat cushion 41 in such a manner as to freely swing back and forth, a rear part of the seat cushion 41 is rotatably attached to the bracket 34 on the vehicle body floor 12, and the bracket 34 and the lock member 42 are linked together by means of the link 43, so that the lock member 42 is allowed to fall down into the lower surface of the seat cushion 41 when the seat cushion 41 is rotated rearward.

It will be preferred that the perpendicularly projecting lock member 42 can be collapsed when the seat cushion 41 and the seat back 46 folded up on the seat cushion 41 are rotated toward the rear of the vehicle so that the seat cushion 41 and the seat back 46 are stored in the recessed portion 28 provided in the vehicle body floor 12.

To make this happen, the bracket 34 for rotatably supporting the rear part of the seat cushion 41 and the lock member 42 are linked together by means of the link 43 so that the lock member 42 is allowed to fall down into the lower surface of the seat cushion 41 when the seat cushion 41 is rotated rearward.

Namely, the posture of the lock member 42 can automatically be altered from the projecting condition to a collapsed condition, whereby the seat cushion 41 and the seat back 46 which are folded up into the vehicle body floor 12 can be stored with good appearance, and the storing properties of the seat can be improved. As a result, the space inside the passenger compartment can be used comfortably.

The function of the third-row seat 40R will be described below.

Figure 6A:
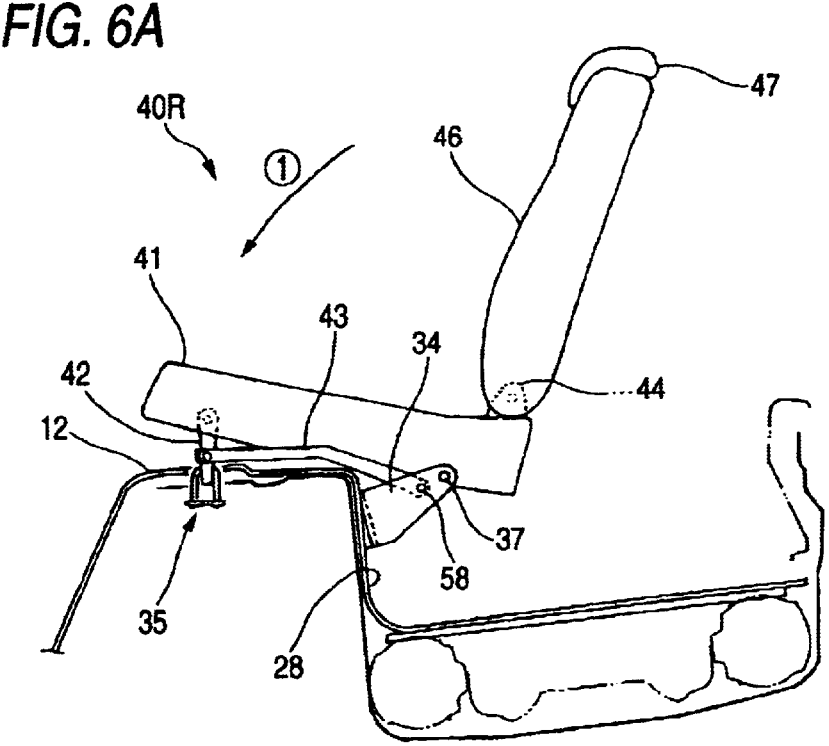
FIGS. 6A and 6B are explanatory views (former half portion of an explanation) explaining the function of the vehicle seat according to the invention.
Figure 6B:
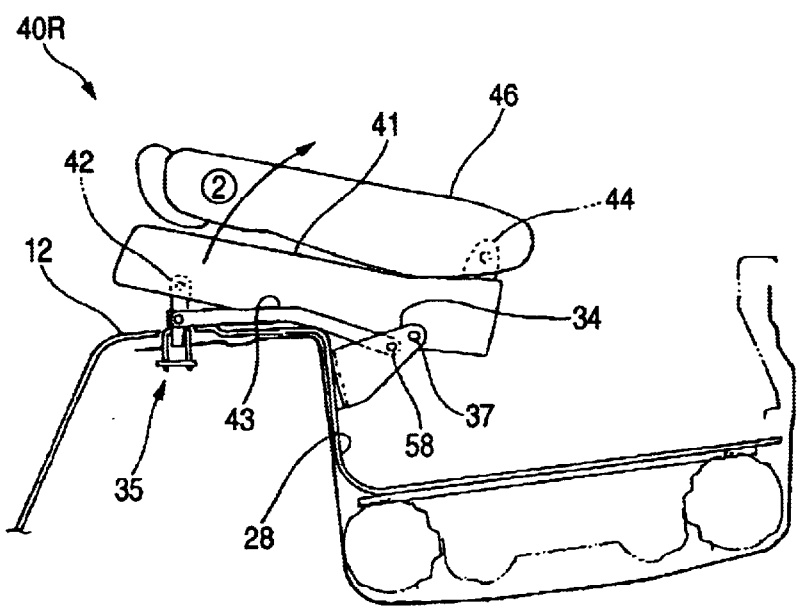

FIGS. 6A, 6B are explanatory views (a former half portion of the explanation) explaining the function of the vehicle seat according to the invention.

In FIG. 6A, the third-row seat 40R is shown as being in use, and the seat back 46 will be folded up onto the seat cushion 41 as indicated by an arrow (1).

In FIG. 6B, the lock member 42 is released from the striker 35 on the vehicle body floor 12, and the seat cushion 41 and the seat back 46 so folded up on the seat cushion 41 are then started to be rotated on the support shaft 37 in the bracket 34 toward the rear of the vehicle as indicated by an arrow (2).

Figure 7A:
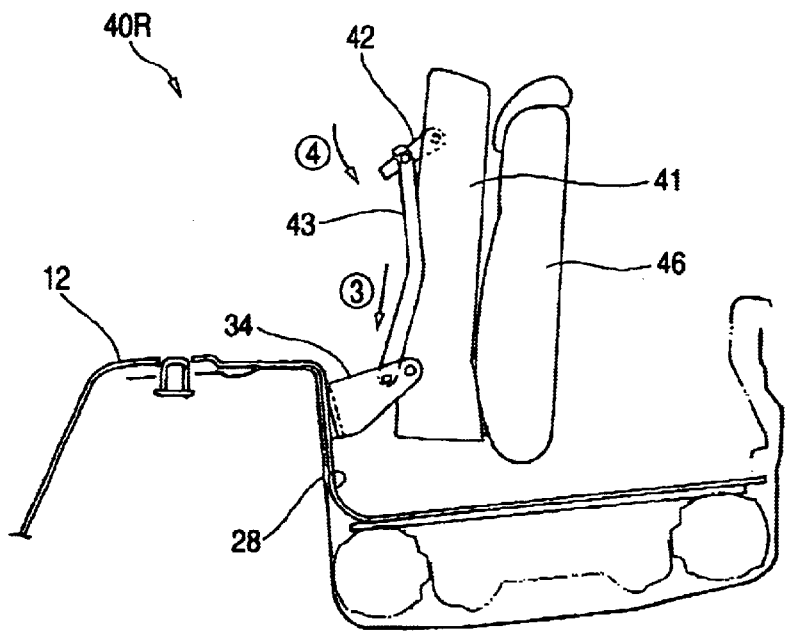
FIGS. 7A and 7B are explanatory views (latter half portion of the explanation) explaining the function of the vehicle seat according to the invention.
Figure 7B:
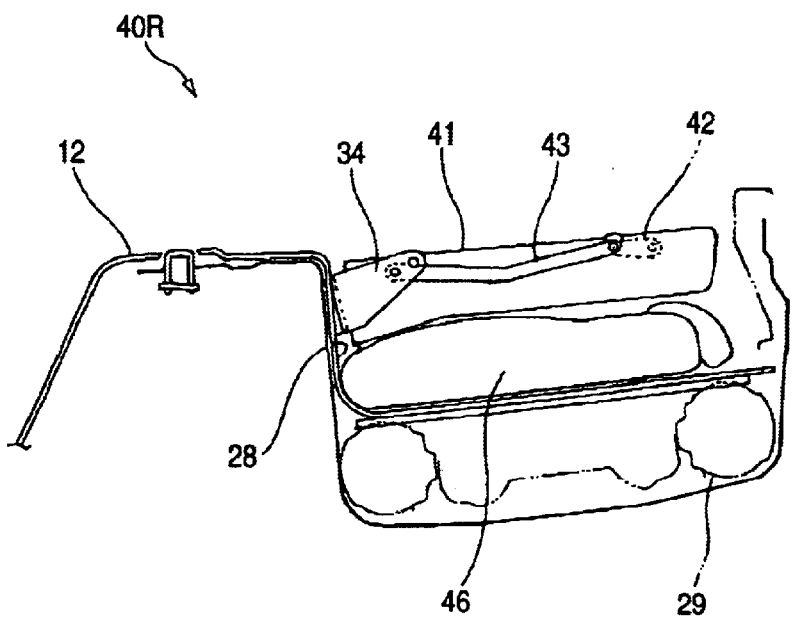

FIGS. 7A, 7B are explanatory views (a latter half portion of the explanation) explaining the function of the vehicle seat according to the invention.

In FIG. 7A, the lock member 42 is drawn in a direction indicated by an arrow (3) as the seat cushion 41 and the seat back 46 are rotated rearward, and as a result, the lock member 42 projecting at right angles from the seat cushion 41 is drawn toward the seat cushion 41 and is translated into a collapsed condition as indicated by an arrow (4).

In FIG. 7B, it is shown that the posture of the lock member 42 can be automatically altered from the protruding condition to a collapsed condition after the storage of the seat cushion 41 and the seat back 46 into the vehicle body floor 12 is completed.

Namely, the seat cushion 41 and the seat back 46 can be stored in the vehicle body floor 12 with good appearance. As a result of this, the space in the passenger compartment can be used comfortably.

In addition, since the lock member 42 is designed to spring up from the lower surface of the seat cushion 41 when the seat cushion 41 is rotated forward, the posture of the lock member 42 can be restored from the collapsed condition to the projecting condition, whereby a simple and quick operation can be realized when the third-row seat 40R is restored to the seating condition from the stored condition.

Figure 8:
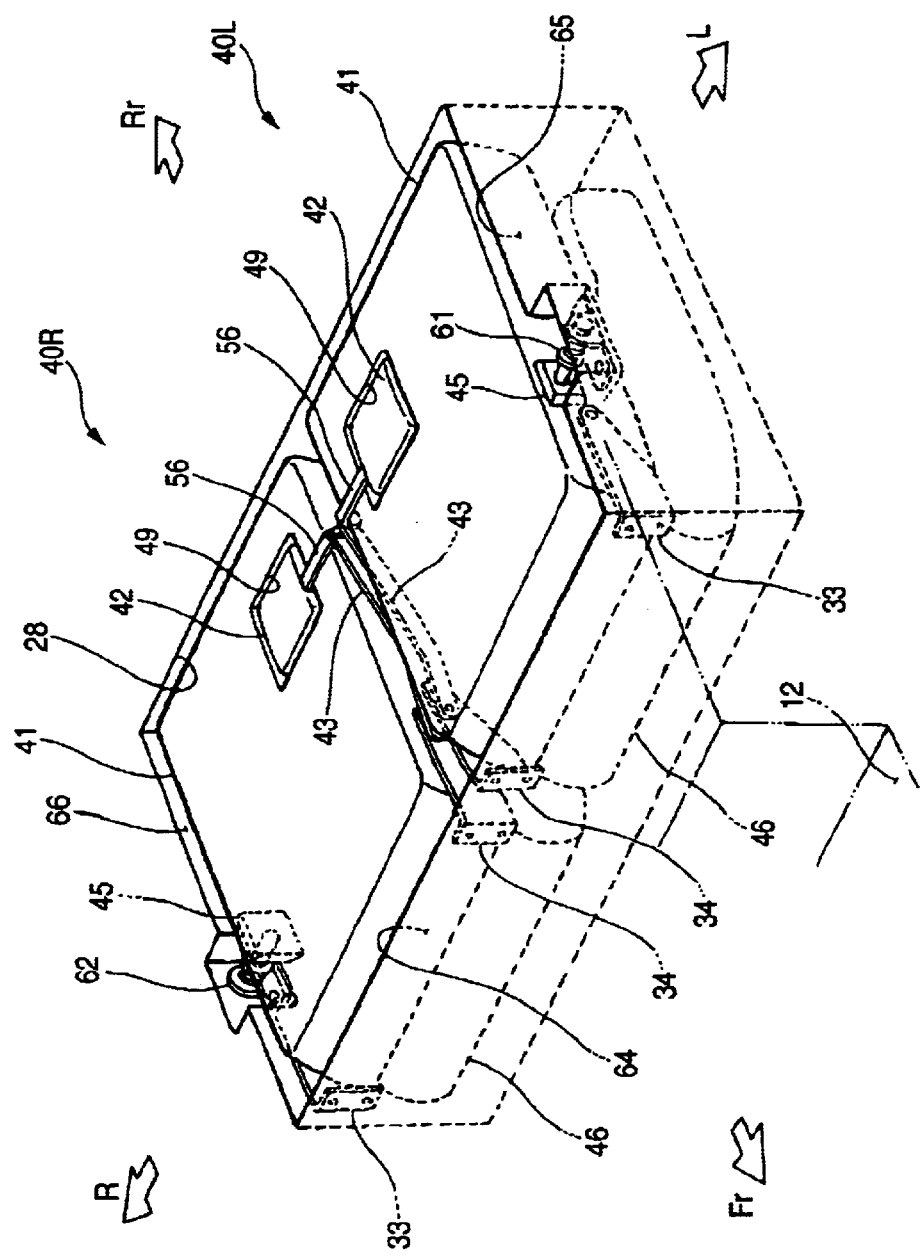
FIG. 8 is a perspective view showing a stored condition of the vehicle seat according to the invention.

FIG. 8 is a perspective view showing a stored condition of the vehicle seat according to the invention, and it is shown in the figure that the brackets 33, 34 are attached to a front wall surface 64 of the recessed portion 28 for rotatably supporting the seat cushion 41 of the third-row seat 40L, that the brackets 33, 34 are also attached to the front wall surface 64 of the recessed portion 28 for rotatably supporting the seat cushion 41 of the third-row seat 40R, that the retaining member 61 is attached to a left wall surface 65 of the recessed portion 28 for locking the seat cushion 41 of the third-row seat 40L to the vehicle body floor 12 side and that the lock member 62 is attached to the right wall surface 66 of the recessed portion 12 for locking the seat cushion 41 of the third-row seat 40R to the vehicle body floor 12 side.

Namely, the third-row seats (vehicle seats) 40L, 40R are structured such that the brackets 33, 33, 34, 34 extend rearward from the front wall surface 64 of the recessed portion 28 and such that the left and right retaining members 61, 62 for retaining the respective seat cushions 41, 41 are provided, respectively, on the left and right wall surfaces 65, 66 of the recessed portion By constructing the third-row seats (vehicle seats) 40L, 40R such that the brackets 33, 33, 34, 34 extend rearward from the front wall surface 64 of the recessed portion 28 and such that the left and right retaining members 61, 62 for retaining the respective seat cushions 41, 41 are provided, respectively, on the left and right wall surfaces 65, 66 of the recessed portion 28, the brackets 33, 33, 34, 34 and the retaining members 61, 62 are prevented from protruding from the vehicle body floor 12. As a result, the vehicle body floor 12 with the third-row seats 40L, 40R being stored therein can be used effectively.

Figure 9:
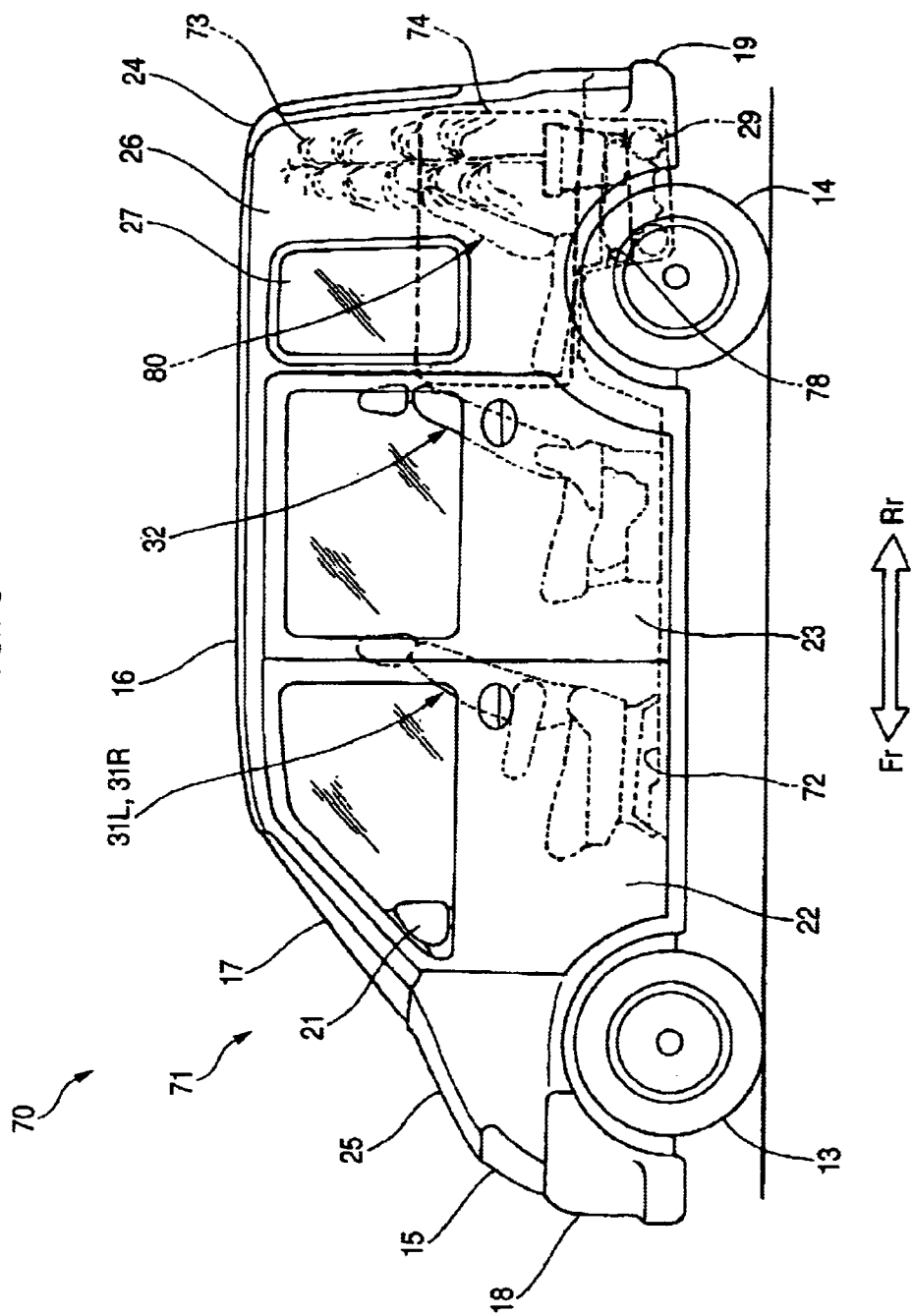
FIG. 9 is a side view of a vehicle equipped with a vehicle seat according to a second embodiment of the invention.

FIG. 9 is a side view of a vehicle equipped with a vehicle seat according to a second embodiment of the invention. Like reference numerals are to be given to like components to those used in FIG. 1 and the detailed description thereof will be omitted.

In the figure, reference numeral 70 denotes a vehicle, 71: a vehicle body; 72: a vehicle body floor; 13: a front wheel; 14: a rear wheel; 15: a headlamp; 16: a roof; 17: a windscreen; 18: a front bumper; 19: a rear bumper; 21: an outside rearview mirror; 22: a front door; 23: a rear door; 24: a tail gate; 25: a front fender; 26: a quarter panel; 27 a quarter panel window; 78: a recessed portion provided in the vehicle body floor 72; 76, 77: left and right edge portions of the recessed portion 78; 79, 79: side frames of the vehicle body 71; and 29: a spare tire stored in the recessed portion 78. The vehicle 70 is structured such as to realize a wide variety of seat arrangements by being constituted by first-row seats 31L, 31R, a second-row seat 32 and third-row seats 80.

Note that reference numeral 73 denotes a vertically long article such as a garden plant and reference numeral 74 denotes a horizontally long box-like article.

FIG. 10 is an exploded view of the vehicle seat according to the second embodiment of the invention.

A third-row seat 80 includes a support shaft 83 which is attached to the vehicle body floor 72 via left and right support holders 81, 82, left and right seat cushions 85, 86 rotatably attached to the support shaft 83 and left and right seat backs 87, 88 attached to the seat cushions 85, 86, respectively, via hinges 89 . . . ( . . . denotes a plural number) in such a manner as to be folded up onto the seat cushions, respectively.

The seat cushion 85 includes a through recessed portion 91 having a semi-circular cross section which is provided for allowing the support shaft 83 to pass through the seat cushion 85, bearings 92, 92 rotatably attached to the support shaft 83, inner holding members 93, 93 and outer holding members 94, 94 for holding the bearings 92, 92, setscrews 95 . . . for fastening the inner and outer holding members 93, 93, 94, 94 to the seat cushion 85, a fastening portion 96 for fastening the seat cushion 85 to the vehicle body floor 72 side when the seat cushion 85 is stored in the recessed portion 78, and a lock member 97 stored in a lower surface of the seat cushion 85 for setting the seat cushion 85 in a seating condition.

In addition, reference numerals 98, 98 (shown only on the right side) denote strikers on which the lock members 97, 97 are fitted when the seat cushions 85, 86 are set in the seating condition, and strikers 99, 99 provided on left and right inner sides of the vehicle 70 are lock members for locking the seat cushions 85, 86 to the vehicle body floor 72 side when they are stored in the recessed portion 78. In addition, the seat cushion 86 is a cushion which is transversely symmetrical with the seat cushion 85, and therefore the detailed description thereof will be omitted.

In the figure, reference numeral 101 denotes an inner tube for the bearing 92 and reference numeral 102 denotes an outer tube for the bearing 92.

FIG. 11 is a side view of the vehicle seat according to the second embodiment of the invention, and the third-row seat (the vehicle seat) 80 is a vehicle seat wherein the left and right seat backs 87, 88 (refer to FIG. 10 for 87) are attached, respectively, to the left and right seat cushions 85, 86 (refer to FIG. 10 for 85) in such a manner as to be folded up thereon, wherein the support shaft 83 is provided on the left and right seat cushions 85, 86 so that the seat cushions 85, 86 and the seat backs 87, 88 so folded up on the seat cushions 85, 86, respectively, are rotated individually to the rear of the vehicle 70, wherein the seat cushions 85, 86 and the seat backs 87, 88 so rotated are stored in the recessed portion 78 in the vehicle body floor 72, and wherein the support shaft 83 is provided on the vehicle body floor 72 so as to be supported in the vicinity of edge portions 76, 77 (refer to FIG. 10 for 76) of the recessed portion 78.

According to the construction wherein the left and right seat backs 87, 88 (refer to FIG. 10 for 87) are attached, respectively, to the left and right seat cushions 85, 86 (refer to FIG. 10 for 85) in such a manner as to be folded up on the left and right seat cushions 85, 86, respectively, and wherein the seat cushions 85, 86 and the seat backs 87, 88 so folded up on the seat cushions 85, 86 are rotated individually to the rear of the vehicle 70 (refer to FIG. 9) so that the seat cushions and the seat backs can be stored in the recessed portion 78 in the vehicle body floor 72, for example, by storing one of the left and right seat cushions 85, 86 and seat backs 87, 88 in the recessed portion 78 and folding up the other of the seat backs 87, 88 on the other of the seat cushions 85, 86, a vertically long article 73 (refer to FIG. 9) such as a garden plant is loaded on the vehicle by making use of the recessed portion 78 and a horizontally long box-like article 74 is loaded on the seat back 87, 88 so folded up or on the seat cushion 85, 86 stored in the recessed portion 78. Namely, the vertically long article 73 such as a garden plant and the horizontally long box-like article 74 can be loaded at the same time, and a variety of seat arrangements can be realized depending upon the types of articles.

In addition, there is no risk that the support shaft 83 constitutes a hindrance to the loading and unloading of articles by providing the support shaft 83 on the vehicle body floor 72. As a result, the working efficiency with which articles are loaded and unloaded can be improved. Additionally, since the support shaft 83 is supported in the vicinity of the edge portions 76, 77 (refer to FIG. 10 for 76) of the recessed portion 78, the left and right seat cushions 85, 86 (refer to FIG. 10 for 76) can be supported at central positions of the recessed portion 78 owing to tile rigidity of the edge portions 76, 77.

Note that there is no preventing the support shaft 83 from being provided in the vicinity of the surface of the vehicle body floor 72 or within the recessed portion 78.

In addition, the third-row seat (the vehicle seat) 80 may be structured such that inner tubes 101 . . . of bearings 92 . . . (only one for each is shown in the figure) are fitted on the support shaft 83, outer tubes 102 . . . of the bearings 92 . . . are fixed to the left and right seat cushions 85, 86 (85 on this side is not shown in the figure) via holding members 93, 94 (only one for each is shown in the figure), and end portions of the support shaft 83 are fixed to the sides of the vehicle body floor 72.

In general, central portions of the vehicle body surface or central portions of the recessed portion are low in rigidity when compared with end portions thereof. In case the support shaft is fixed to the portions which are low in rigidity, reinforcements are sometimes required, causing an increase in weight of the vehicle body. To cope with this, fixing the support shaft 83 to the sides of the vehicle body floor 72 surface, for example, to side frames 79, 79 which are higher in rigidity at the end portions thereof can manage to omit reinforcements, thereby making it possible to reduce weight of the vehicle 70 (See FIG. 9).

There is no hindrance to the fixation of the support shaft 83 to the sides of the vehicle body floor 72 surface, the sides of an area in the vicinity of the vehicle body floor 72 or the sides of the recessed portion 78.

Figure 12A:
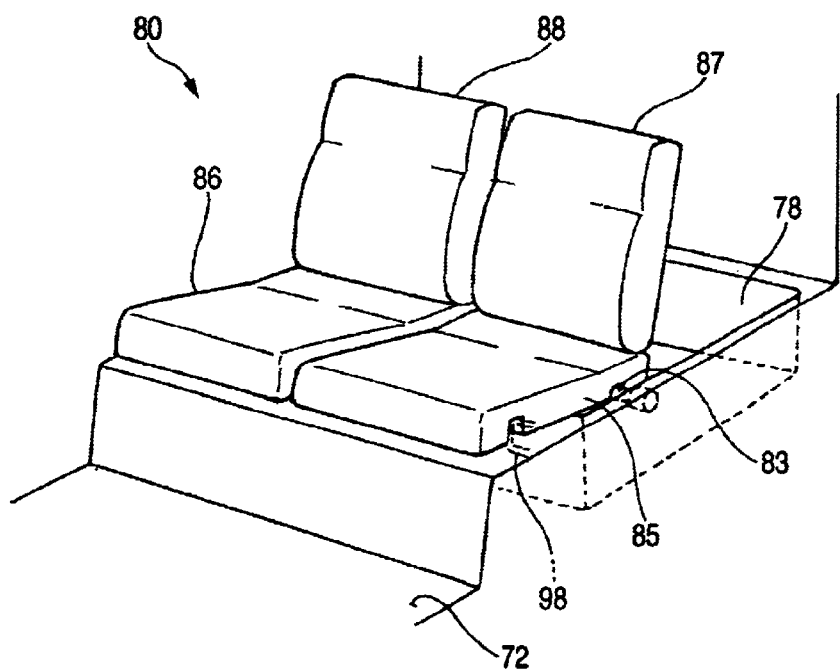
FIGS. 12A and 12B are explanatory views (part 1) explaining the function of the vehicle seat according to the second embodiment of the invention.
Figure 12B:
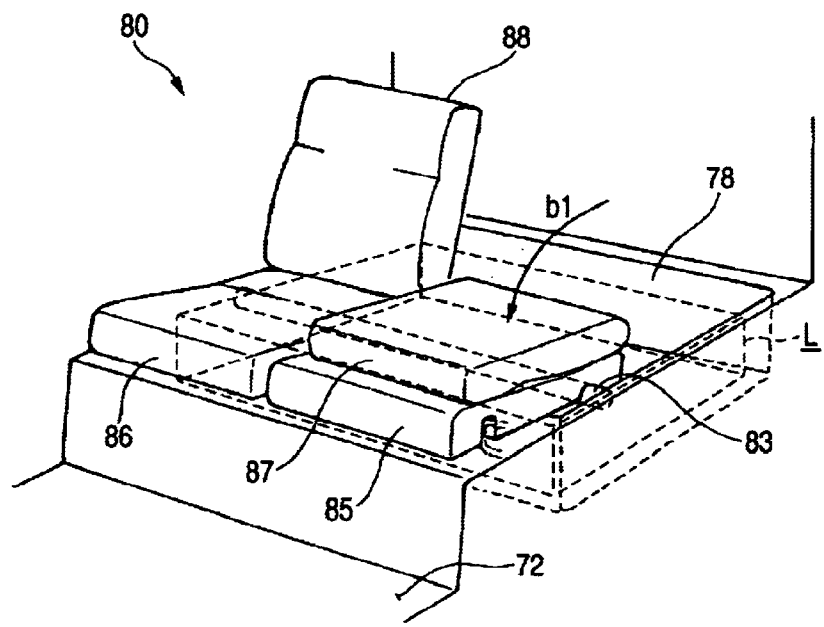

FIGS. 12A, 12B are explanatory views (part 1) explaining the function of the vehicle seat according to the second embodiment of the invention.

In FIG. 12A, the third-row seat (the vehicle seat) 80 is shown as being set in the seating condition by the passenger.

In FIG. 12B, a passenger can be seated in the seat while the horizontally long box-like article 74 (refer to FIG. 9) can be loaded at the rear left-hand side portion of the vehicle 70 (refer to FIG. 9) by folding up the left seatback 87 onto the left seat cushion 85 as indicated by an arrow b1.

In addition, as shown in FIG. 12B, since a space with a width substantially close to the width of the vehicle is formed in the recessed portion 78 below the support shaft 83, a baggage large in length and breadth such as a traveling bag L can be loaded in the recessed portion 78.

Figure 13A:
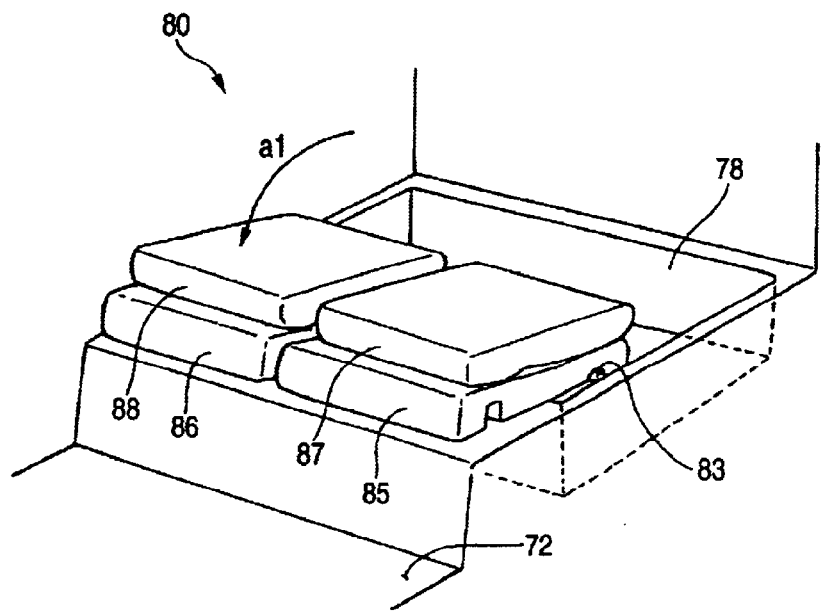
FIGS. 13A and 13B are explanatory views (part 2) explaining the function of the vehicle seat according to the second embodiment of the invention.
Figure 13B:
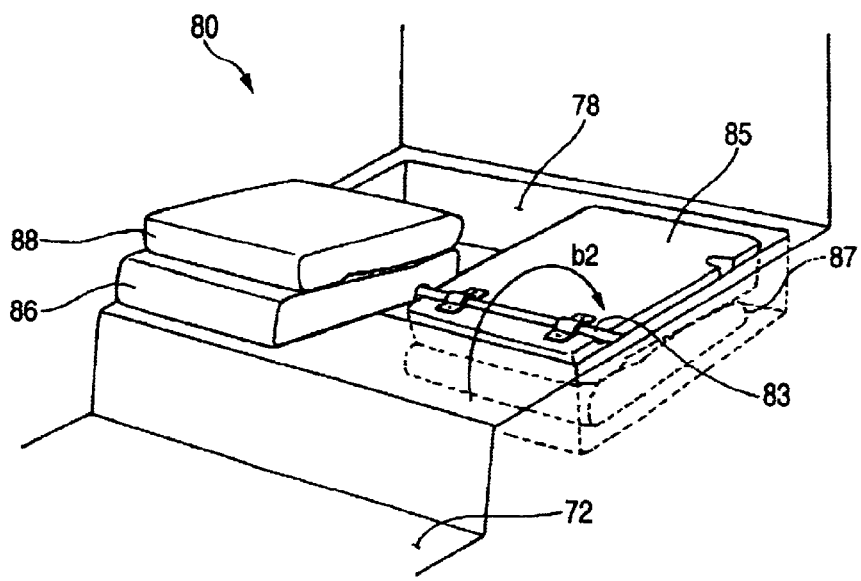

FIGS. 13A, 13B are explanatory views (part 2) explaining the function of the vehicle seat according to the second embodiment of the invention.

In FIG. 13A, by folding up the right seat back 88 onto the right seat cushion 86 as indicated by an arrow a1 an article (luggage) can be loaded using the recessed portion 78 in the vehicle floor 72 or the article can be loaded on the left and right seat backs 87, 88 which are folded up.

In FIG. 13B, the left seat back 87 which is folded up and the left seat cushion 85 are rotated as indicated by an arrow b2 so as to be stored in the recessed portion 78 in the vehicle floor 72. The rear left-hand side portion of the vehicle floor 72 can be made flat.

Figure 14A:
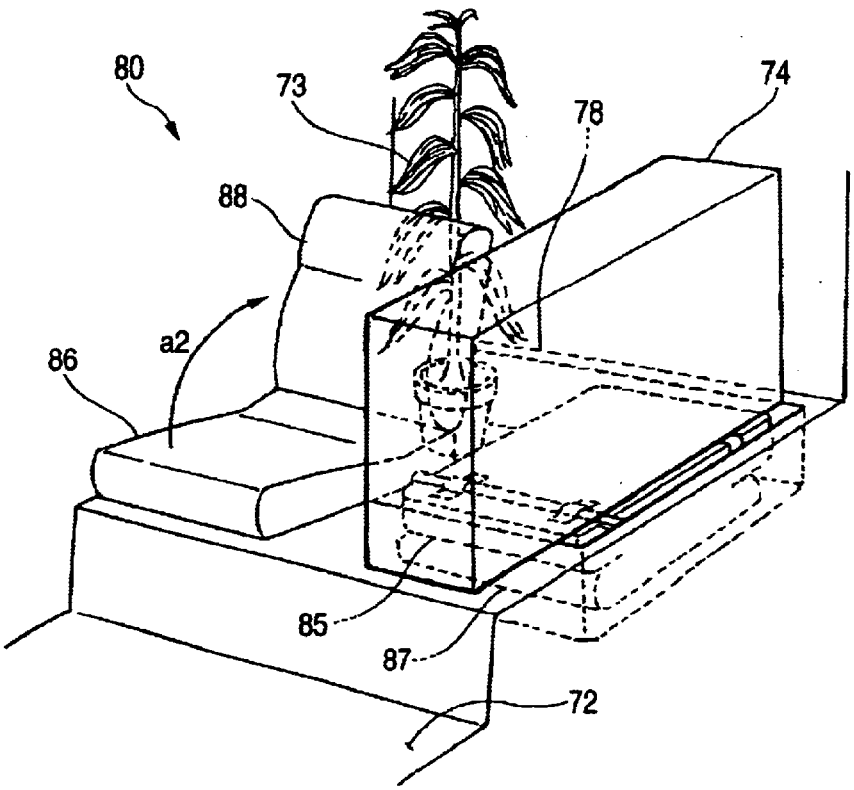
FIGS. 14A and 14B are explanatory views (part 3) explaining the function of the vehicle seat according to the second embodiment of the invention.
Figure 14B:
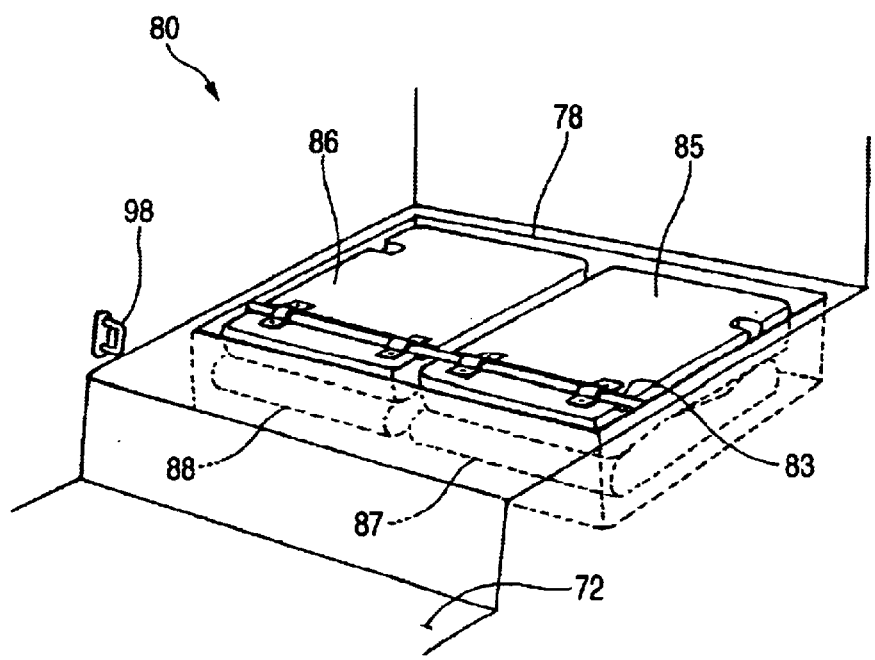
Figure 15:
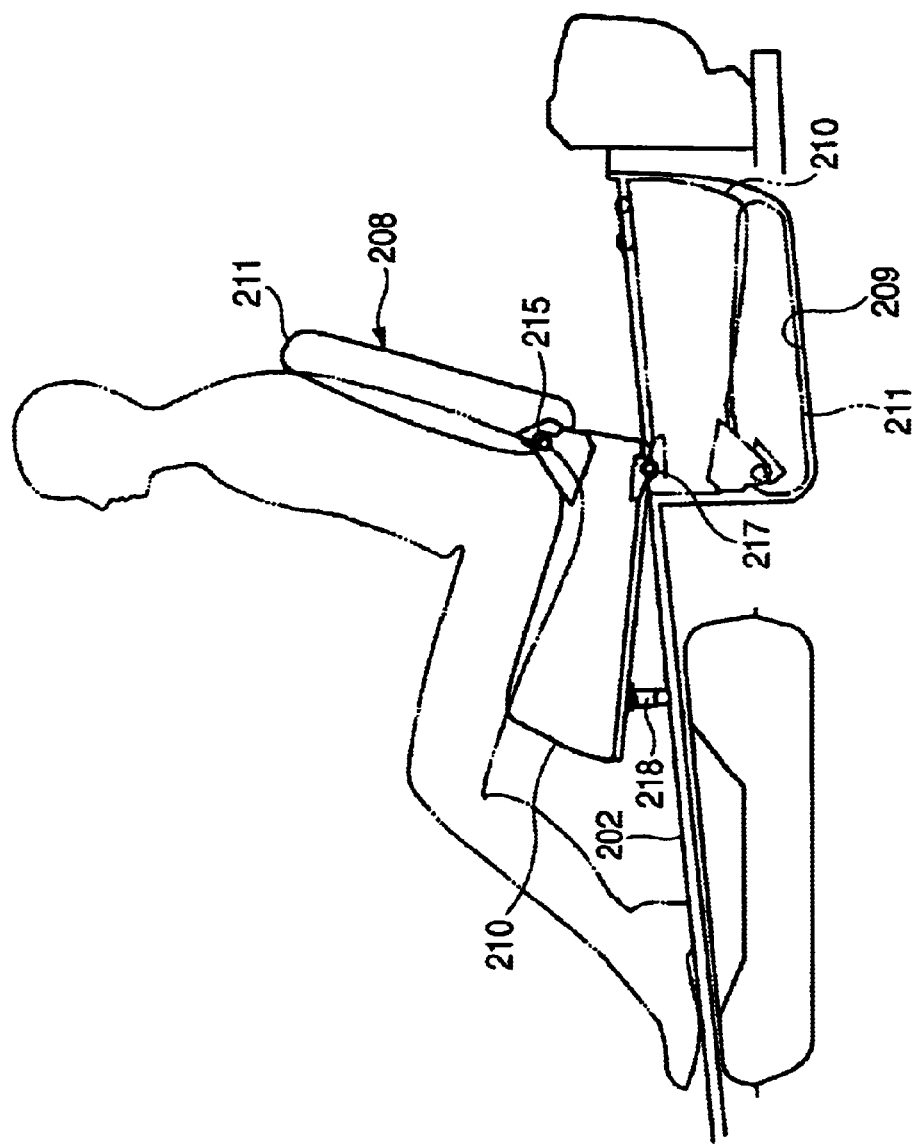
FIG. 15 is a side view of the conventional vehicle sheet.

FIGS. 14A, 14B are explanatory views (part 3) explaining the function of the vehicle seat according to the second embodiment of the invention.

In FIG. 14A, a passenger can be seated in the seat by erecting the right seat back 88 as indicated by an arrow a2 and the vertically long article 73 such as a garden plant can be loaded by making use of the right-hand side portion of the recessed portion 78, while the horizontally long box-like article 74 can be loaded as well by making use of the rear left-hand side portion of the vehicle floor 72 which is made flat by storing the left seat cushion 85 and the left seat back 87 in the recessed portion 78.

In FIG. 14B, the left and right seat cushions 85, 86 and the left and right seat backs 87, 88 are all stored in the recessed portion 78 to thereby make flat the rear part of the vehicle body floor 72, whereby an article (luggage) having a larger volume can be stored therein.

Note that while the vehicle seat (the third-row seat) 40L, 40R has been described as the third-row seat, as shown in FIG. 2, in the first embodiment, the invention is not limited thereto, and the vehicle seat may be used as a second-row seat or a fourth-row seat or a seat in any row thereafter.

In addition, while the lock member 42 as the supporting member is described as fitting on the striker 35 and as being automatically altered in posture from the projecting condition to the collapsed condition by means of the link 43 as the connecting member, as shown in FIG. 2, in the embodiment, the invention is not limited thereto, and the supporting member may be structured to supporting the seat cushion to be struck against the vehicle body floor. And, the connecting member may be a cable in addition to the link 43.

In the second embodiment, while the support shaft 83 is designed to be attached to the vehicle body floor 72, as shown in FIG. 10, the invention is not limited thereto, and the support shaft 83 may be provided so as to be supported in the vicinity of the surface of the vehicle body floor 72 or within the recessed portion 78.

While the support shaft 83 is designed such that the end portions thereof are supported on the vehicle body floor 72 in the vicinity of the edge portions 76, 77 of the recessed portion 78, as shown in FIG. 10, in the second embodiment, the invention is not limited thereto, and the end portions of the support shaft 83 may be fixed to the sides of the surface of the vehicle body floor 72, the sides of the area in the vicinity of the vehicle body floor 72 or the sides of the recessed portion 78, and they may be fixed to, for example, portions such as the side frames 79, 79 which are higher in rigidity.

Being constructed as has been described heretofore, the invention provides the following advantages.

According to the first aspect of the invention, the left and right seat backs are attached, respectively, to the left and right seat cushions in such a manner as to be folded up on the left and right seat cushions, respectively, and the seat cushions and the seat backs so folded up on the seat cushions are rotated individually to the rear of the vehicle so that the seat cushions and the seat backs can be stored in the recessed portion in the vehicle body floor. Thus, for example, by storing one of the left and right seat cushions and seat backs in the recessed portion and folding up the other of the seat backs on the other of the seat cushions, a vertically long article such as a garden plant is loaded on the vehicle by making use of the recessed portion and a horizontally long box-like article is loaded on the seat back so folded up or on the seat cushion stored in the recessed portion. Namely, the vertically long article such as a garden plant and the horizontally long box-like article can be loaded at the same time, and a variety of seat arrangements can be realized depending upon the types of articles.

In addition, since the support shaft is provided to be supported in the vicinity of the surface of the vehicle body floor or within the recessed portion, there is caused no hindrance to the loading and unloading of articles. Namely, the working efficiency with which articles are loaded and unloaded can be improved. Furthermore, since the support shaft is supported in the vicinity of the edge portions of the recessed portion, the rigidity of the edge portion allows the left and right seat cushions to be supported at the central positions of the recessed portion.

In general, central portions of the vehicle body surface or central portions of the recessed portion are low in rigidity when compared with end portions thereof. In case the support shaft is fixed to the portions which are low in rigidity, reinforcements are sometimes required, leading to a call for an increase in weight of the vehicle body.

According to the second aspect of the invention, the inner tubes of the bearings are fitted on the support shaft, and the outer tubes of the bearings are fixed to the left and right seat cushions via the holding members, whereby the end portions of the support shaft are fixed to the sides of the surface of the vehicle body floor or the sides of the recessed portion, for example, to portions such as the side frames which are higher in rigidity, thereby making it possible to omit reinforcements, this leading to the reduction in weight of the vehicle.

According to the third aspect of the invention, since the bracket and the lock member or the support member are linked together by means of the link or cable so that the lock member or the support member is allowed to fall down into the lower surface of the seat cushion when the seat cushion is rotated rearward, the posture of the lock member or the support member can automatically be altered from the projecting condition to the collapsed condition, whereby the seat cushion and the seat back which are folded up into the vehicle body floor can be stored with good appearance, and the storing properties of the seat can be improved. As a result, the space inside the passenger compartment can be utilized comfortably.

In addition, since the lock member or the support member is designed to spring up from the lower surface of the seat cushion when the seat cushion is rotated forward, the posture of the lock member or the support member can automatically be restored to the projecting condition from the collapsed condition, whereby a simple and quick operation can be realized when the vehicle seat is restored to the seating condition from the stored condition.

According to the fourth aspect of the invention, since the storage portion for storing the lock member is formed in the lower surface of the seat cushion so that the lock member can be stored in the storage portion when the seat cushion is rotated rearward, the lock member can be stored in the storage portion when the seat cushion and the seat back are stored in the recessed portion. As a result, the lower surface of the seat cushion can constitute a flat surface when the seat cushion is stored in the recessed portion.

According to the fifth aspect of the invention, since the bracket extends rearward from the front wall surface of the recessed portion and the retaining members for retaining the seat cushions are provided on the left and right wall surfaces of the recessed portion, the vehicle body floor with the vehicle seat being stored therein can be used effectively.

According to the sixth aspect of the invention, since the seat cushion and the seat back are divided transversely so as to be stored in the recessed portion individually, the convenience in arranging the seat can be attempted to be improved.

What is claimed is:

1. A vehicle seat, comprising:

left and right seat cushions;

left and right seat backs attached to said left and right seat cushions, respectively, in such a manner as to be folded up thereon, a support shaft provided on said left and right seat cushions for allowing said left and right seat cushions and said left and right seat backs folded up on said left and right seat cushions to be rotated toward the rear of a vehicle individually, wherein said seat cushions and said seat backs so rotated about said support shaft are storable in a recessed portion in a vehicle body floor, wherein said support shaft is provided in such a manner as to be situated within said recessed portion so that said support shaft is supported in the vicinity of edge portions of said recessed portion;

wherein end portions of said support shaft are fixed to sides of a floor surface of said vehicle body or sides of said recessed portion; and wherein said end portions of said support shaft are fixed to side frames of said vehicle body.

2. The vehicle seat as set forth in claim 1, further comprising:

a first bearing having an inner tube fitted on said support shaft and an outer tube fixed to the vehicle seat proximate an edge thereof via a first holding member; and a second bearing having an inner tube fitted on said support shaft and an outer tube fixed to the vehicle seat proximate an opposing edge thereof via a second holding member.

3. The vehicle seat as set forth in claim 1, further comprising:

a pair of first rotation support members provided at the left seat cushion, each first rotation support member having an inner tube fitted on said support shaft and an outer tube fixed to one side of the left seat cushion; and a pair of second rotation support members provided at the right seat cushion, each second rotation support member having an inner tube fitted on said support shaft and an outer tube fixed to one side of the right seat cushion.

4. The vehicle seat as set forth in claim 3 wherein the pair of first rotation support members are spaced from each other in a width direction of the seat cushion, and the pair of second rotation support members are spaced from each other in a width direction of the seat cushion.

5. A vehicle seat comprising:

a seat cushion;

a seat back folded up on said seat cushion, wherein said seat cushion and said seat back so folded up on said seat cushion are rotated toward the rear of a vehicle so that said seat cushion and said seat back so rotated are stored in a recessed portion provided in a vehicle body floor;

a supporting member suspended from a lower surface of a front part of said seat cushion in such a manner as to freely swing back and forth;

a bracket provided on said vehicle body floor for rotatably attaching a rear part of said seat cushion; and a connecting member connecting said bracket with said support member so that said support member is allowed to fall down into the lower surface of said seat cushion when said seat cushion is rotated rearward.

6. The vehicle seat as set forth in claim 5, wherein said seat cushion has a storage portion in the lower surface thereof for storing said supporting member so that said supporting member is stored in said storage portion when said seat cushion is rotated rearward.

7. The vehicle seat as set forth in claim 5, wherein said bracket extends rearward from a front wall surface of said recessed portion.

8. The vehicle seat as set forth in claim 5, wherein retaining members for retaining said seat cushion are provided on left and right wall surfaces of said recessed portion.

9. The vehicle seat as set forth in claim 5, wherein said seat cushion and said seat back are divided transversely so as to be storable in said recessed portion individually.

10. The vehicle seat as set forth in claim 5, wherein said support member is a lock member adapted to be fixed to a striker disposed on said vehicle body floor.

11. The vehicle seat as set forth in claim 5, wherein said support member is adapted to be struck against said vehicle body floor.

12. The vehicle seat as set forth in claim 5, wherein said connecting member is a link or a cable.

* * * * *